United States Patent Office 2,931,286
Patented Apr. 5, 1960

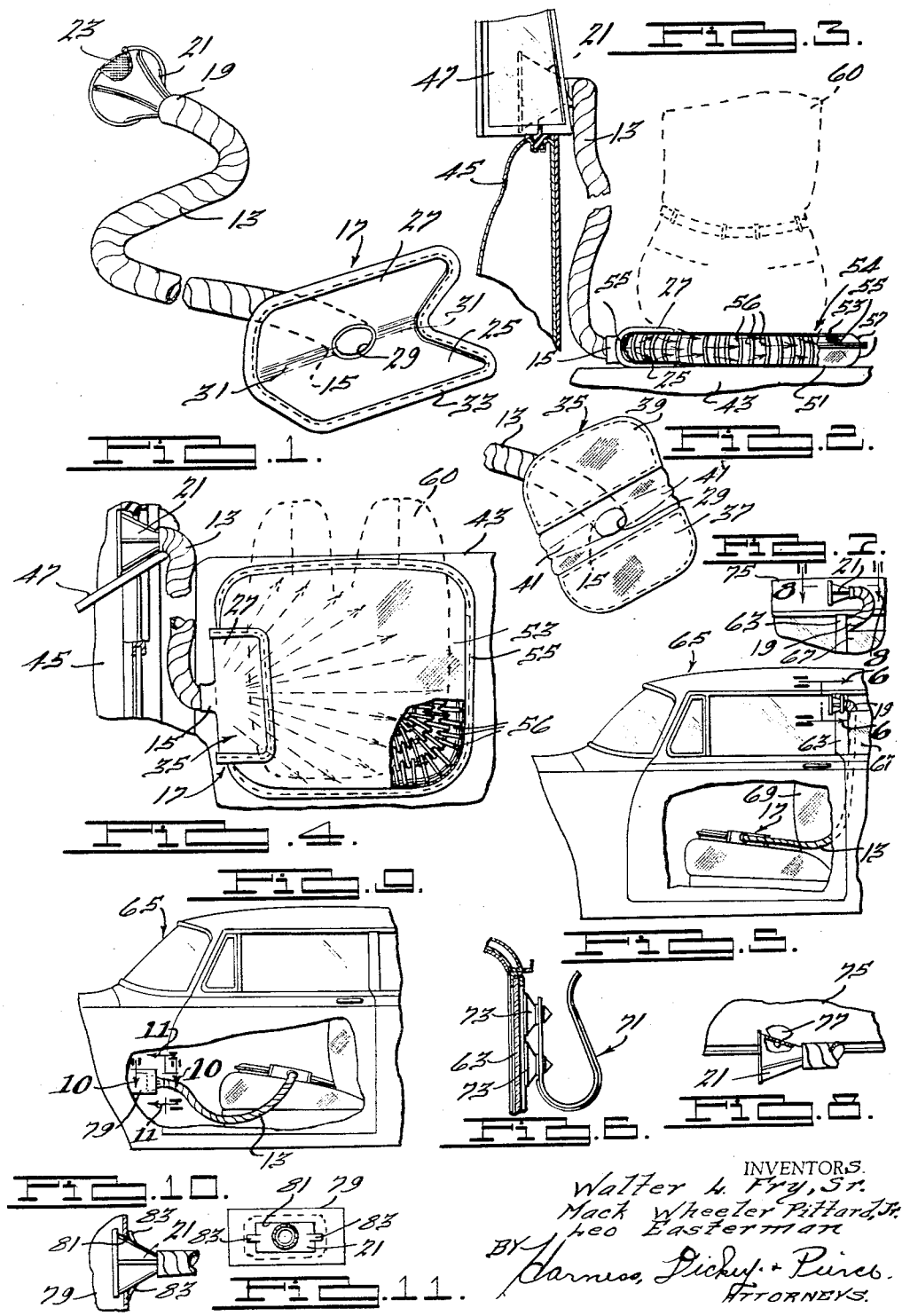

2,931,286

FLUID CONDUIT ARTICLE OF MANUFACTURE AND COMBINATION ARTICLE OF MANUFACTURE

Walter L. Fry, Sr., and Mack Wheeler Pittard, Jr., Birmingham, and Leo Easterman, Detroit, Mich.

Application September 13, 1956, Serial No. 609,675

3 Claims. (Cl. 98—2)

This invention relates to simplified means for cooling the area on seats of passenger-carrying vehicles, particularly automotive vehicles.

It is well known that present day seat constructions in passenger carrying vehicles are conducive to perspiration from those parts of the anatomy of passengers which contact the seating area, rendering the ride an unpleasant one principally from the standpoint of comfort and even from the standpoint of economy as the pressing bills of the traveling public have been noted to increase particularly during warm summer days. Heretofore a myriad of complicated constructions have been proposed for cooling the seat proper in passenger carrying vehicles. What has been proposed has been for the most part impractical and has not received widespread acceptance.

With the foregoing in view the principal objects of the invention are two-fold; first, to provide a low-cost article of manufacture in the form of fluid conduit means which can be carried about and which is adapted to fit any of the varied seat cushions presently on the market and which has incorporated in its construction fluid control and distributing members; and second, to provide an article of manufacture comprising the combination of the foregoing fluid conduit means and of a seat cushion which combination is efficient in operation and pre-eminently satisfactory for controlling and distributing cooling fluid beneath the parts of the anatomy of seated passengers in motor vehicles.

The above and related objects will become apparent during the course of the following description taken in conjunction with the accompanying drawings.

In the drawings:

Figure 1 is a view in perspective of the article of manufacture in the form of fluid conduit means embodying the present invention.

Figure 2 is a fragmentary view similar to that of the structure of Figure 1 with a modified form of fluid control and distributing means at one end of the fluid conduit.

Figure 3 is an elevational view partly in section showing the combination article of manufacture embodying the invention in use in an automotive vehicle.

Figure 4 is a top view of the structure of Figure 3.

Figure 5 is a fragmentary side elevation with parts shown broken of an automotive vehicle having placed therein, in a different position for use, the combination article of manufacture embodying the present invention.

Figure 6 is a lefthand side view of part of the structure of Figure 5 with parts removed substantially along the line 6—6 thereof.

Figure 7 is a fragmentary view of part of the structure of Figure 6 showing the fluid-receiving end of the fluid conduit mounted in a different position on the automotive vehicle of Figure 5.

Figure 8 is a fragmentary view of the structure of Figure 7 along line 8—8 thereof.

Figure 9 is a view similar to Figure 5 showing the combination article of manufacture in use on an automotive vehicle with the fluid-receiving end of the conduit secured on the interior thereof.

Figures 10 and 11 and horizontal and vertical fragmentary sectional views on the lines 10—10 and 11—11 respectively, of Figure 9, showing in greater detail the manner of affixing the fluid-receiving end of the conduit.

In copending application Serial Number 59,106 filed June 13, 1956, now abandoned, of the same inventors as the instant application there is disclosed the basic feature of construction of a simplified combination article of manufacture for circulating cooling fluid beneath seated passengers to cool the parts of the anatomy of the passengers contacting the article and to minimize perspiration therefrom. While the combination article described and claimed therein is highly useful and practical, no means are provided for controlling and distributing the fluid immediately entering the space between the cover members of the seat cushion and therebeyond. It has since been found that if the cooling fluid which enters the space between the cover members is controlled and distributed so as to insure its circulation throughout the major portions of the seat cushion, unexpected increases in the cooling efficiency of the combination article result and a considerably more comfortable ride is obtained. The combination article of manufacture which embodies the present invention has been employed on automotive vehicles on hot summer days and while it is extremely difficult to determine accurately the increase in cooling efficiency that has resulted, it is estimated that the cooling effect is increased approximately 50% over the combination article of the copending application referred to.

Briefly and in a broad aspect the means for accomplishing the objects of the present invention comprises an article of manufacture in the form of fluid conduit means including a fluid conduit, at one end of which is secured fluid control and distributing means, the other end of which is constructed to receive fluid therein for circulation through the space between the cover members of a seat cushion. The type of seat cushion for use with which the fluid conduit article of manufacture is primarily intended is of a type in which at least one of the cover members is foraminous and in which the material along at least one side of the seat cushion is also foraminous. As a practical matter modern seat cushions for use in automotive vehicles are constructed of foraminous material principally throughout including the top and bottom cover member and the sides. The fluid control and distributing means referred to and which is secured on the one end of the fluid conduit article of manufacture is constructed as in the embodiments shown and which will be described in greater detail hereinafter. As a minimum the fluid control and distributing means should include at least one impervious member secured at the one end of the fluid conduit which has a portion disposed forward of the one end most preferably in axial alignment with the opening in the one end and which portion should have a width equal at least to the diameter of this opening. In its preferred form of construction the fluid control and distributing means at the one end of the fluid conduit has a construction which will accommodate the wide variety of thicknesses of different seat cushions presently in use. The combination article of manufacture which embodies the present invention comprises the combination of a seat cushion of the type specified and of the foregoing fluid conduit article of manufacture the essential features of construction of which will appear during the following description.

Referring now to the drawings, and in particular to Figure 1, the article of manufacture in the form of fluid conduit means shown therein for circulating cooling fluid through the space between cover members of a seat cushion comprises a tubular conduit 13 one end of which as at 15 has secured thereto fluid control and distributing means, indicated generally at 17. The other end of the fluid conduit, as at 19, is constructed to receive fluid therein from a source of cooling fluid having a fluid head sufficient to force fluid into the space within the seat cushion. In one arrangement of the combination article in use the end 19 of the conduit 13 is intended to be disposed directly into the path of moving air currents passing by the exterior of the automotive vehicle. For this purpose a flared, substantially conical, funnel member 21 provided with a screen 23 is fitted into the end 19 as shown. The funnel member 21 is preferably flexible and readily distortable and conveniently is formed of polyethylene plastic. The fluid control and distributing means 17 is so constructed as to accommodate different thicknesses of seat cushions and in the embodiment shown in Figure 1 comprises a pair of impervious members, indicated generally at 25, 27, which are attached to and disposed forward of the end 15. The member 25 is attached at the bottom of the opening designated 29 in the end 15 and the member 27 is attached to the top of this opening. Both of the members 25, 27 have a width which is appreciably greater than the diameter of the opening 29 and extend radially beyond opposite sides of the opening from the center thereof as shown. The impervious members 25, 27 are joined along the length of their inner edges by impervious material, indicated generally at 31, which is disposed on opposite sides of the opening 29. In the embodiment being described the impervious members 25, 27 and the impervious material 31 are in reality one continuous piece of flexible impervious material. The continuous piece of impervious material which constitutes the members 25, 27 and the material 31 in one form, for example, is a sheet of aluminum foil which is stitched by way of a binding 33 to backing material which conveniently can be a sheet of simulated leather plastic. Thus, the pair of impervious members 25, 27 and the impervious material 31 can be bent into any number of different positions as may be dictated during use and are capable of temporarily retaining these positions and when desired are capable of assuming a planar position. The construction described for the fluid control and distributing means 17 permits the pair of impervious members 25, 27 to be disposed in spaced relation to one another different distances apart to accommodate different thicknesses of seat cushions.

The modified form of fluid control and distributing means shown secured to the conduit 13 in Figure 2 is indicated generally at 35. In this embodiment the pair of impervious members, designated 37, 39 are relatively stiff being formed, for example, of low-cost paper board material. The impervious material in this embodiment joining the pair of impervious members 37, 39 along the length of their inner edges is flexible and indicated generally at 41. By way of example the impervious material 41 can be formed of cloth material. As in the previous embodiment the pair of impervious members 37, 39 and the impervious material 41 may be stitched as shown to a sheet of simulated leather plastic backing material. The fluid control and distributing means 35 can be manufactured more economically than that shown in the previous embodiment and notwithstanding that the pair of impervious members 37, 39 are relatively stiff, the means 35 is capable nevertheless of accommodating widely variant sizes of seat cushions.

Figures 3 and 4 shown the operation and use of the fluid conduit article of manufacture previously described, in combination with a conventional foraminous seat cushion on the seat proper of a motor vehicle. In Figures 3 and 4 the seat proper of the motor vehicle is indicated generally at 43 and shown associated therewith is part of the side construction of the vehicle which is generally designated 45 and includes the side vent window 47 as shown. In this example of use the funnel member 21 is inserted in front of the vent window 47 as shown to scoop in the fast moving air currents which are deflected by the vent window 47. Because the funnel member 21 is flexible and readily distortable, the vent window 47 can assume most any desired position. If necessary, the funnel member 21 can be pinched considerably between the window frame and the side vent window 47 without damage. The fast moving air that enters the funnel member 21 is directed through the conduit 13 to the opening 29 in the end 15 thereof. From the opening 29 the cooling fluid circulates through the space between the lower and upper cover members designated 51, 53, respectively of a seat cushion, indicated generally at 54. The seat cushion 54 is of relatively large extent in the plane of the horizontal body portions of the cover members 51, 53 in contrast to its extent in a direction perpendicular to this plane. The seat cushion 54 is constructed and arranged to support weight transmitted in the said direction without collapse. The weight-supporting construction of the seat cushion 54 is of a type well known in the art and preferably is resilient, as in the form shown by way of example in Figures 3 and 4. In the form shown the weight-supporting construction of the seat cushion 54 consists of a plurality of continuously interconnected wire coils 56 disposed in a vertical plane.

In the instance shown each of the cover members 51, 53 is formed of a foraminous material and is stitched together by way of a binding 55 as shown. The material of the pair of cover members 51, 53 between the binding 55 and the main horizontal body portions of each form the sides of the seat cushion 54 and these sides are indicated generally at 57. By this arrangement the four sides 57 of the cushion 54 are foraminous and capable of passing cooling fluid therethrough. The fluid that immediately enters the space between the cover members 51, 53 and the fluid therebeyond is controlled and distributed by the pair of impervious members 25, 27 which embrace the exterior of the seat cushion 54 as shown in Figures 3 and 4. As shown therein the end 15 of the conduit 13 abuts against one of the sides 57 and the impervious members 25, 27 are disposed in contiguous relation with the cover members 51, 53, respectively. With the type of seat cushion shown when the end 15 is abutted against one of the sides 57, the binding 55 will be bent either downward or upward somewhat as shown in Figure 3, and thus present some hindrance to the free passage of the cooling fluid into the space between the cover members 51, 53 but not such as to interfere with the efficient operation of the combination article. In many instances modern seat cushions are formed with no binding and the seat cushion 54 shown by way of example discloses probably the largest type of binding which might be encountered in actual practice. By proper design of the opening 29 and the pair of impervious members 25, 27, the effect of the binding 55 can be minimized. The arrows in Figs. 3 and 4 exemplify the path of the cooling fluid due to the function of the pair of impervious members 25, 27 during operation of the combination article. The passenger who is to derive the comfort from the operation of the combination article is shown in outline in Figures 3 and 4, as at 60, and would normally be seated on the seat cushion 54 in position shown with a portion of his anatomy covering the impervious member 27. Through this arrangement the fluid which enters the space between the cover members 51, 54 would be directed and distributed over substantially the total extent of the seat cushion 54, somewhat as shown by the arrows in Figure 4, with the main body of the cooling fluid being forced directly across the space within the seat cushion and part of it being directed to the front and to the rear thereof by the pair of impervious members 25, 27. The fluid which immediately enters the space within the seat cushion is prevented from escaping transversely of the pair of impervious members 25, 27 as indicated by the arrows in Figure 3. A good portion of the fluid that travels beyond the length of the pair of impervious members 25, 27 passes through the upper cover member 53 and is thus able to circulate about the clothing of the passenger 60 whereby to minimize perspiration from those parts of his anatomy which contact the seat cushion and to keep neat and trim his clothing. It is desirable that the length of the pair of impervious members 25, 27 be such that they reach the seating area contacted by the passenger when he is seated as in the usual case substantially centrally of the seat cushion 54. In practice it has been found that a length of approximately three times the diameter of opening 29 for each of the pair of impervious members 25, 27 is sufficient for this purpose. As a minimum each of the pair of impervious members 25, 27 should have a portion in axial alignment with the opening 29 of a width at least substantially equal to the diameter of the opening 29. Each of the pair of impervious members 25, 27 in the instance shown has a width which is appreciably greater than the diameter of the opening 29 and extends radially beyond opposite sides of this opening from the center thereof so as to prevent the escape of cooling fluid which spreads radially outwardly after leaving the opening 29. It has been found that effective control and distribution of the fluid radially beyond opposite sides of the opening 29 can be accomplished in most applications if the width of each of the impervious members 25, 27 is approximately equal to five times the diameter of the opening 29. The combined width and length of each of the impervious members 25, 27 should preferably be such that each covers an area over one of the cover members at least as great as a semi-circle having its center at the center of a diameter of the opening 29 and having for its radius the length of the cover members, most preferably the length specified. It should be understood that the length and width set forth of each of the pair of impervious members 25, 27 can be altered considerably for a particular application and should be considered as illustrative and not interpreted in a limiting sense.

Another example of use of the combination article is shown in Figure 5 wherein the funnel member 21 is secured to the center post 63 of the motor vehicle shown by way of example and indicated generally at 65. In this example the fluid-receiving end 19 of the conduit 13 extends out of the vehicle above the rear window 67 and the conduit 13, for the most part, is disposed behind the seat proper 69 so that the front seat passenger can have free access in and out of the vehicle without disturbing the position of the end 19 and the funnel member 21 fitted therein. For retaining the funnel member 21 affixed to the center post 63 a bracket member 71 as shown in Figure 6 may be employed. The bracket member 71 preferably has the shape as shown for engaging the funnel member 21 and is provided with a pair of suction cups 73 which have been found to be more than adequate for retaining the funnel member 21 in place during use.

A different manner for affixing the funnel member to the structure of the vehicle 65 during use is shown in Figures 7 and 8. The funnel member 21 in this instance is secured to the roof 75 of the vehicle by means of a suction cup 77 secured in an aperture in the side of the funnel member 21 as shown.

In the example of use of the combination article shown in Figures 9 through 11, the fluid-receiving end 19 of the conduit 13 is secured on the interior of the vehicle 65, as shown, to a source of fluid which reaches the interior of the vehicle proper. The source can conveniently be the fresh air vent system or the air condititioning system of the vehicle 65 and in either case a box-like outlet, as at 79, is usually incorporated in the modern automotive vehicle and has a rectangular outlet opening, as at 81. The advantage of constructing the funnel member 21 so that it is flexible and distortable is clearly shown in the arrangement shown wherein it is desired to connect the fluid receiving-end 19 of the conduit 13 to the fresh air vent system or air-conditioning system of the vehicle. For this purpose the funnel member 21 can be appreciably distorted and forced through even a rectangular opening, as shown for the opening 81, and thereafter pulled rearwardly to seal off the opening so that the main body of the fresh or conditioned air is scooped within the funnel member 21. As shown in Figures 9–11, the funnel member 21 is provided with detents on oppoite sides thereof in the form of tabs 83 partially punched out of the plastic sheet constituting the material of the funnel member. The tabs 83 are adapted to engage opposite sides of the opening 81 to prevent movement of the funnel member 21 inwardly thereof. The tabs 83 are also capable of being pushed back into line with the main body of the funnel member 21 when they are not being used so that the latter can be employed for receiving moving air on the exterior of the vehicle as previously described.

It will thus be seen that there has been provided by this invention an article of manufacture in the form of fluid conduit means and a combination article of manufacture in which the objects hereinabove set forth together with many thoroughly practical advantages are successfully achieved. It will be apparent that the invention is susceptible to modification, change and variation without departing from the spirit thereof or from the scope of the appended claims.

What is claimed is:

1. For use with a seat cushion having sides, a bottom surface and a foraminous top surface, a cooling attachment comprising a distributing member having a pair of stiff flat impervious portions and a bendable connecting portion providing for movement of said stiff portions to spaced substantially parallel positions adapted to be positioned against and covering a substantial area of said top and bottom surfaces in a position of said connecting portion against one of said sides, means attached to said connecting portion for delivering cooling air at a position between said stiff portions and directed inwardly of said cushion, said stiff portions acting to deflect said air inwardly of the cushion and prevent escape thereof through said top and bottom surfaces at a position adjacent said one side.

2. For use with a seat cushion having sides, a bottom surface and a foraminous top surface, a cooling attachment comprising an impervious distributing member adapted to be detachably mounted on said cushion in a position outwardly of a central seating portion thereof, said distributing member being of a substantially U-shape having substantially parallel leg portions adapted to engage and cover a substantial area of said top and bottom surfaces and a connecting bight portion adapted to be positioned against one of said sides, and means attached to said bight portion for delivering cooling air thereto so that said air is directed inwardly of said cushion between said leg portions, said leg portions acting to deflect said air inwardly of said cushion and prevent escape thereof through said top surface at a portion adjacent said one side.

3. For use with a seat cushion having sides, a bottom surface and a foraminous top surface, a cooling attachment comprising an impervious distributing member adapted to be detachably mounted on said cushion in a position outwardly of a central seating portion thereof, said distributing member being of a substantially U-shape having substantially parallel leg portions adapted to engage and cover a substantial area of said top and bottom surfaces and a connecting bight portion adapted to be positioned against one of said sides, means attached to said bight portion for delivering cooling air thereto so that said air is directed inwardly of said cushion between said leg portions, said leg portions acting to deflect said air inwardly of said cushion and prevent escape thereof through said top surface at a position adjacent said one side, and a single backing member secured to and arranged in an overlying relation with said leg and bight portions.

References Cited in the file of this patent

UNITED STATES PATENTS

| | | |
|---|---|---|
| 2,091,594 | Innes | Aug. 31, 1937 |
| 2,158,801 | Petterson | May 16, 1939 |
| 2,758,532 | Awe | Aug. 14, 1956 |
| 2,780,495 | Brown | Feb. 5, 1957 |